(12) United States Patent
Yoshimura et al.

(10) Patent No.: US 12,447,524 B2
(45) Date of Patent: Oct. 21, 2025

(54) MOLD MANUFACTURING METHOD

(71) Applicants: KIMURA FOUNDRY CO., LTD., Shizuoka (JP); OKUMA CORPORATION, Aichi (JP)

(72) Inventors: Kazutoshi Yoshimura, Gunma (JP); Takumi Nishiwaki, Shizuoka (JP); Yuya Obara, Aichi (JP); Takayuki Kakuda, Aichi (JP)

(73) Assignees: KIMURA FOUNDRY CO., LTD., Shizuoka (JP); OKUMA CORPORATION, Aichi (JP)

( * ) Notice: Subject to any disclaimer, the term of this patent is extended or adjusted under 35 U.S.C. 154(b) by 0 days.

(21) Appl. No.: 18/873,226

(22) PCT Filed: Aug. 17, 2023

(86) PCT No.: PCT/JP2023/029771
§ 371 (c)(1),
(2) Date: Dec. 9, 2024

(87) PCT Pub. No.: WO2024/075408
PCT Pub. Date: Apr. 11, 2024

(65) Prior Publication Data
US 2025/0262660 A1    Aug. 21, 2025

(30) Foreign Application Priority Data
Oct. 5, 2022    (JP) .................. 2022-160764

(51) Int. Cl.
*B22C 9/02*    (2006.01)
*B22C 19/04*    (2006.01)
*B22C 23/00*    (2006.01)

(52) U.S. Cl.
CPC ................ *B22C 19/04* (2013.01); *B22C 9/02* (2013.01); *B22C 23/00* (2013.01)

(58) Field of Classification Search
CPC .................................. B22C 23/00; B22C 9/02
See application file for complete search history.

(56) References Cited

U.S. PATENT DOCUMENTS 6,015,007 A * 1/2000 Hunter .................... B22C 21/10
164/456
2019/0291172 A1    9/2019 Larsen

FOREIGN PATENT DOCUMENTS

| CN | 101279357 A | 10/2008 |
|---|---|---|
| CN | 10266911 A | 12/2011 |

(Continued)

OTHER PUBLICATIONS

International Search Report Issued in Application No. PCT/JP2023/029771, dated Oct. 31, 2023.

(Continued)

*Primary Examiner* — Kevin E Yoon
(74) *Attorney, Agent, or Firm* — Michael Best & Friedrich LLP

(57) ABSTRACT

Provided is a mold manufacturing method with which the requirement of a wide variety of products in a small lot can be satisfied. A cutting step includes forming, through cutting, mold matching surfaces in respective upper and lower molds and forming, through cutting, cavities C1 and C2 in the respective upper and lower molds with the mold matching surfaces being references. A mold matching step includes: measuring at least three points PU1 to 3 that are not located on a same straight line and that are located on the mold matching surface of the lower mold placed on a placement surface; causing recognition of Z coordinates of these respective points; measuring at least three points PL1 to 3 that are not located on a same straight line and that are located on the mold matching surface of the upper mold gripped by a gripping arm; causing recognition of Z coordinates of these respective points; and subsequently per- (Continued)

forming mold matching with the mold matching surfaces SmU and SmL of the upper and lower molds being oriented to be kept parallel to each other.

8 Claims, 9 Drawing Sheets

(56) References Cited

FOREIGN PATENT DOCUMENTS

| | | | |
|---|---|---|---|
| CN | 111590030 | A | 8/2020 |
| DE | 10156332 | A1 | 5/2003 |
| EP | 1207365 | A1 | 5/2002 |
| JP | H04-295713 | A | 10/1992 |
| JP | H07-232239 | A | 9/1995 |
| JP | H10249487 | A * | 9/1998 |
| JP | 2017-131901 | A | 8/2017 |
| JP | 2019-536636 | A | 12/2019 |

OTHER PUBLICATIONS

Office Action in Chinese Application No. 202380038614.6, dated Jun. 2, 2025.
Office Action mailed in German Application No. 11 2023 004 156.3, dated Jul. 9, 2025.

* cited by examiner (a)

(b)

(a)

(b)

MOLD MANUFACTURING METHOD

RELATED APPLICATIONS

This application is a national phase application of International Application No. PCT/JP2023/029771, filed Aug. 17, 2023, which claims priority to Japanese Application No. 2022-160764, filed on Oct. 5, 2022, the entire contents of which are incorporated by reference.

TECHNICAL FIELD

The present invention relates to a mold manufacturing method. More specifically, the present invention relates to a mold manufacturing method including: kneading casting sand and a binder, filling flasks therewith, and performing compression so that curing occurs in the flasks, to make sand blocks; performing a cutting step; and performing a mold matching step, to manufacture a sand mold.

BACKGROUND ART

Regarding the above mold manufacturing method, PATENT DOCUMENT 1 is known in relation to such a cutting step, and PATENT DOCUMENT 2 is known in relation to such a mold matching step. In the former document, cutting and a shaping flask for a sand block are combined to shorten the time for the cutting step. Meanwhile, in the latter document, reference pattern blocks 24 to 27 are used for a shaping flask to form reference patterns 28 to 31 on sand molds, and mold matching between the sand molds is performed with the reference patterns being references.

However, neither of these conventional techniques is sufficient for satisfying the requirement of manufacturing a wide variety of castings in a small lot. In the former document, the shaping flask for a sand block cannot satisfy the requirement of a wide variety of products. Meanwhile, in the latter document, adjustment of the finished dimension of a shaped sand block is a prerequisite, and thus, in the case of a small lot, the accuracies of the reference patterns cannot be guaranteed owing to a dimensional error that occurs according to a curing condition.

CITATION LIST

Patent Documents

[PATENT DOCUMENT 1] Japanese Laid-Open Patent Publication No. 2017-131901
[PATENT DOCUMENT 2] Japanese Laid-Open Patent Publication (Translation of PCT Application) No. 2019-536636

SUMMARY OF THE INVENTION

Problems to be Solved by the Invention

Considering the above conventional circumstances, an object of the present invention is to provide a mold manufacturing method with which the requirement of a wide variety of products in a small lot can be satisfied.

Solution to the Problems

To achieve the above object, a mold manufacturing method according to the present invention has the following feature and configuration. That is, the mold manufacturing method is a method including: kneading casting sand and a binder, filling flasks therewith, and performing compression so that curing occurs in the flasks, to make sand blocks; performing a cutting step; and performing a mold matching step, to manufacture a sand mold. The mold manufacturing method is performed with: a machining head configured to be operated by a robot to cut the sand blocks and cut upper and lower molds; and a gripping arm configured to be operated by a robot to grip the upper mold and perform matching between mold matching surfaces, of the upper and lower molds, in which cavities are formed. A Z axis for defining Z coordinates extends in an up-down direction. The cutting step includes forming, through cutting, the mold matching surfaces in the respective upper and lower molds by the machining head and forming, through cutting, the cavities in the respective upper and lower molds by the machining head with the mold matching surfaces being references. The mold matching step includes measuring at least three points that are not located on a same straight line and that are located on the mold matching surface of the lower mold placed on a placement surface, causing recognition of Z coordinates of these respective points, measuring at least three points that are not located on a same straight line and that are located on the mold matching surface of the upper mold gripped by the gripping arm, causing recognition of Z coordinates of these respective points, and subsequently performing mold matching by the gripping arm with the mold matching surfaces of the upper and lower molds being oriented to be kept parallel to each other.

With this configuration, since the cutting step includes forming, through cutting, the mold matching surfaces in the respective upper and lower molds by the machining head and forming, through cutting, the cavities in the respective upper and lower molds by the machining head with the mold matching surfaces being references, the cavities are accurately formed even when post-curing finished dimensions of the sand blocks differ. In addition, since the mold matching step includes measuring at least three points that are not located on a same straight line and that are located on the mold matching surface of the lower mold placed on a placement surface, causing recognition of Z coordinates of these respective points, measuring at least three points that are not located on a same straight line and that are located on the mold matching surface of the upper mold gripped by the gripping arm, causing recognition of Z coordinates of these respective points, and subsequently performing mold matching by the gripping arm with the mold matching surfaces of the upper and lower molds being oriented to be kept parallel to each other, the upper and lower molds can be accurately subjected to mold matching regardless of the orientation of the lower mold. The shaping flasks for the sand blocks can be commonly used for different molds, and different sand molds can be manufactured through only cutting, whereby the requirement of a wide variety of products in a small lot can be satisfied.

In the above feature, it is preferable that: X and Y coordinates for defining lateral directions in X and Y axes orthogonal to the Z axis are present; the cutting step includes forming, through cutting, at least two lateral-direction position matching surfaces near each of the mold matching surfaces of the upper and lower molds by the machining head, the lateral-direction position matching surfaces being oriented such that an intersection angle therebetween is equal to an intersection angle between the X and Y axes; and the mold matching step includes causing recognition of X and Y coordinates of the respective lateral-direction position matching surfaces in each of the upper and lower molds, causing lateral-direction positions of the upper and lower molds to coincide with each other, and performing mold matching by the gripping arm. With this feature, the lateral-direction position matching surfaces are cut, but the other lateral-direction surfaces do not need to be cut, whereby lateral-direction position matching can be accurately performed while the cutting amount of the sand is decreased to a minimum value.

It is preferable that at least one of the at least two lateral-direction position matching surfaces is provided at two or more positions away from each other (one of the lateral position matching surfaces is cut at two or more positions such that the lateral position matching surface is discontinuous). Since at least one of the lateral-direction position matching surfaces is provided at two or more positions away from each other, the tilt of a side on the lateral-direction position matching surface side can be detected, whereby mold matching in the lateral directions becomes more accurate.

It is preferable that: each of the sand blocks that form the upper and lower molds has a convex polygonal shape in a plan view; and each of the lateral-direction position matching surfaces is formed at a corresponding corner of the convex polygonal shape.

It is preferable that: the convex polygonal shape is a rectangular shape; and the lateral-direction position matching surfaces are formed such that cutting lengths thereof differ between adjacent corners and facing corners of the rectangular shape and the cutting lengths are equal between the upper and lower molds. With this configuration, in a case where the upper and lower molds take different rotational positions when mold matching is performed, this difference can be immediately noticed through visual recognition, image recognition, or the like. In particular, in a case where the lateral-direction position matching surfaces are formed at all the corners of the sand mold, such noticing is easily achieved.

It is preferable that: each of the upper and lower molds has, near the mold matching surface thereof, at least two other lateral-direction position matching surfaces obtained through machining by the corresponding robot in addition to the two lateral-direction position matching surfaces, none of the at least two other lateral-direction position matching surfaces being parallel to each other; and X and Y coordinates of two points on the other lateral-direction position matching surfaces in each of the upper and lower molds are recognized, to perform checking regarding the mold matching. Consequently, the accuracy in the mold matching, an error in the cutting, and the like can be checked.

It is preferable that, in the cutting by the corresponding robot, each of the sand blocks has, on an upper side thereof, a formation surface for the corresponding cavity and has a perpendicular wall portion on a side surface thereof near a lower surface of the sand block, and a position adjustment piece is brought into contact with the perpendicular wall portion which is then used as a reference for a horizontal coordinate in the cutting by the robot. With this configuration, the tilt of the sand block can be more accurately decreased to attain coincidence with coordinates, and the cutting amount can be decreased. That is, when a case where the sand block is tilted relative to coordinates is assumed, the cutting amount needs to be increased to guarantee accuracy, but the present invention decreases the need for this increase.

It is preferable that: the gripping arm is provided with a coordinate measurement sensor; after the lower mold is placed on a placement surface for placement thereon of the lower mold, the coordinate measurement sensor is used to cause recognition of each of the coordinates on the lower mold placed on the placement surface; another coordinate measurement sensor is provided at a portion connected to the placement surface for placement thereon of the lower mold; and, for the upper mold gripped by the gripping arm, the other coordinate measurement sensor is used to cause recognition of each of the coordinates on the upper mold in a state where the upper mold is gripped. With this configuration, each of the coordinates on the lower mold is measured in a state where the lower mold is placed on the placement surface, each of the coordinates on the upper mold is measured in a state where the upper mold is gripped by the gripping arm, and mold matching can be performed while a variation factor is decreased to a minimum value in a state where the positional relationship between both molds is ascertained. Consequently, the mold matching can be accurately performed.

Advantageous Effects of the Invention

Features and configurations of the above mold manufacturing method according to the present invention make it possible to provide a mold manufacturing method with which the requirement of a wide variety of products in a small lot can be satisfied through efficient cutting and mold matching. In addition, other features and configurations of the present invention make it possible to decrease the cutting amounts of the sand molds to minimum values and, by making machining efficient, further promote satisfaction of the requirement of a wide variety of products in a small lot.

Other objects, configurations, and effects of the present invention will become apparent from the description of embodiments of the present invention shown below.

DESCRIPTION OF EMBODIMENTS

Next, the present invention will be further specifically described with appropriate reference to the accompanying drawings.

Figure 1:
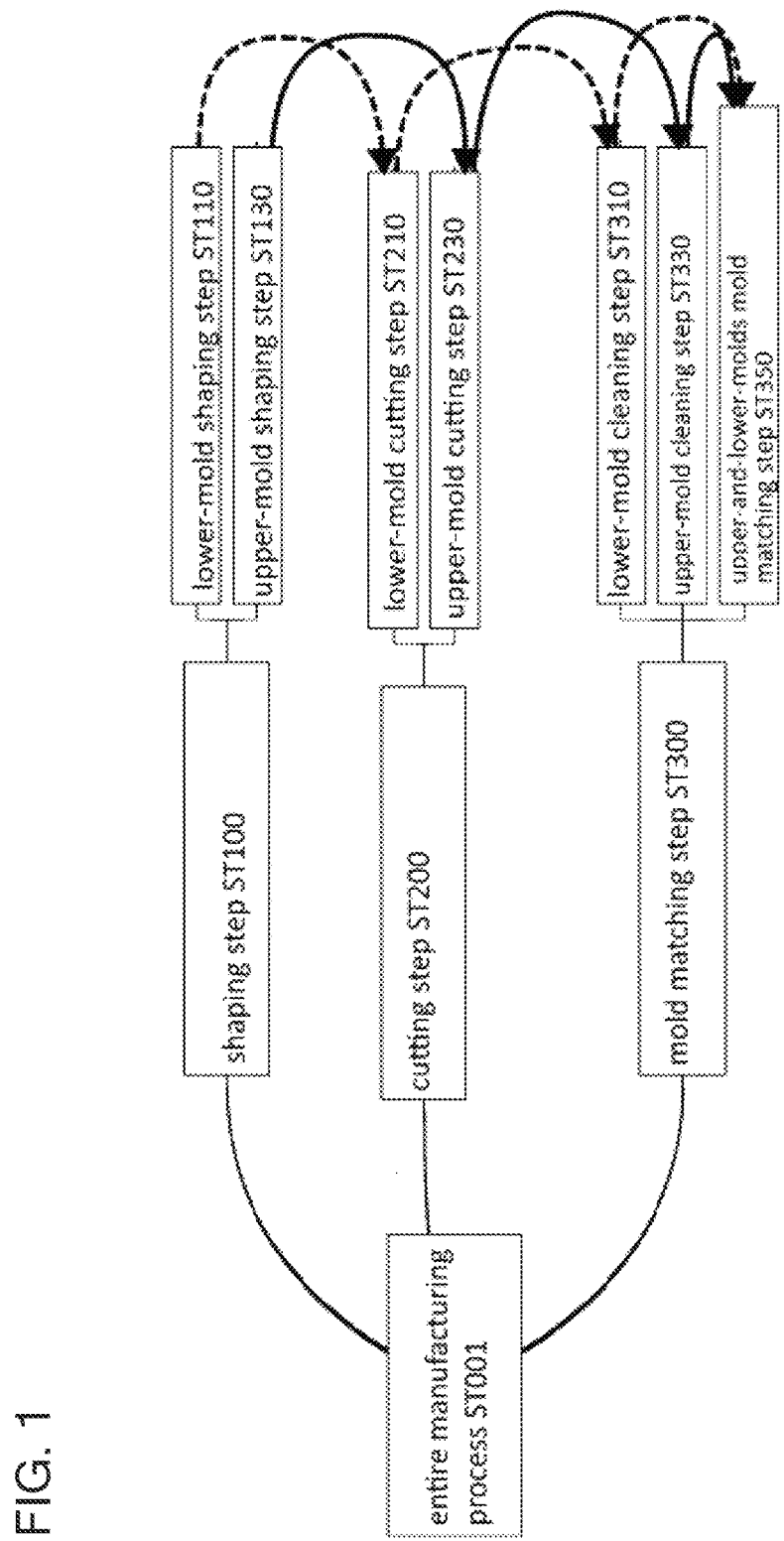
FIG. 1 is a diagram for explaining an overview of an entire process.
Figure 4:
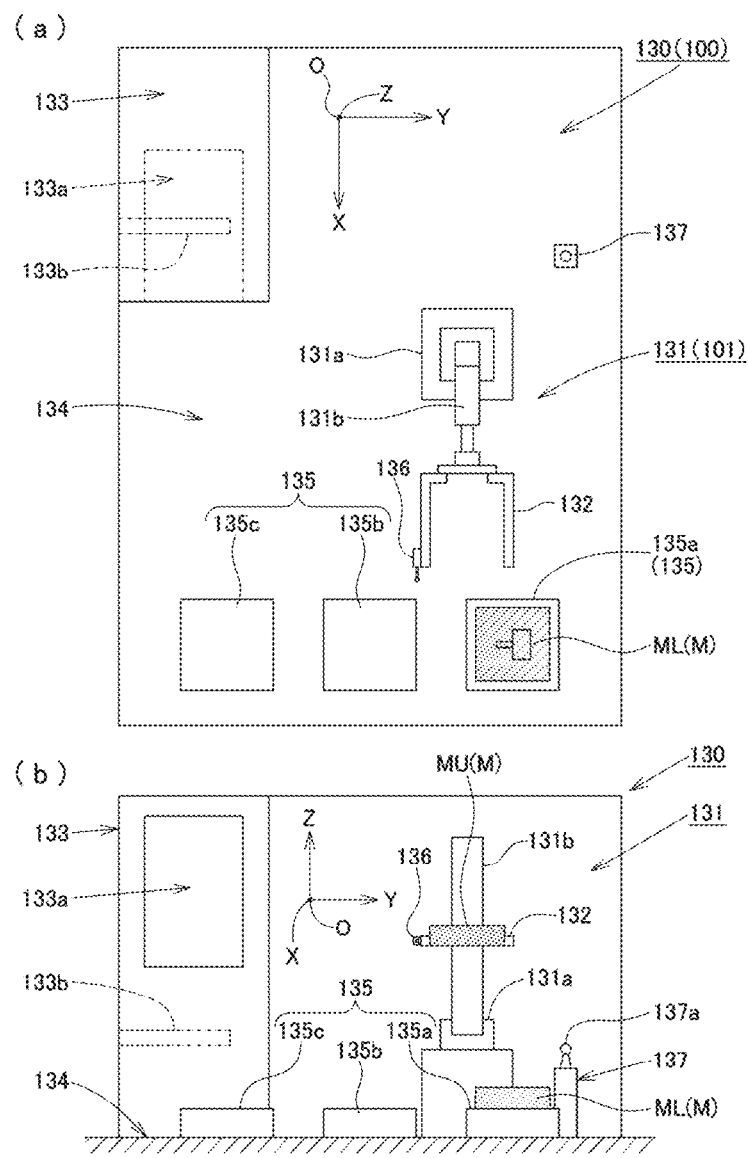
FIG. 4 shows mold matching equipment for performing a mold matching step, FIG. 4(a) being a plan view, FIG. 4(b) being a front view.
Figure 5:
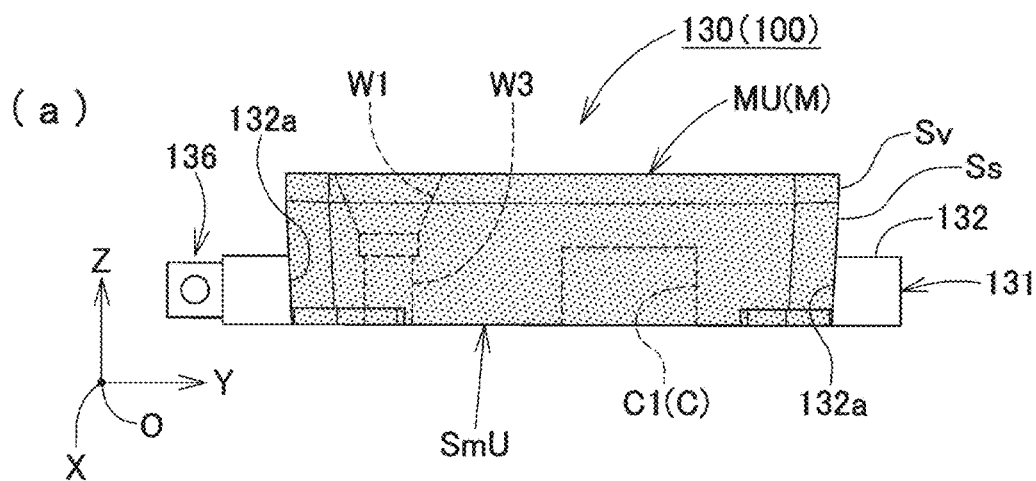
FIG. 5 shows the vicinity of a gripping arm in FIG. 4, FIG. 5(a) being a front view, FIG. 5(b) being a plan view.
Figure 5:
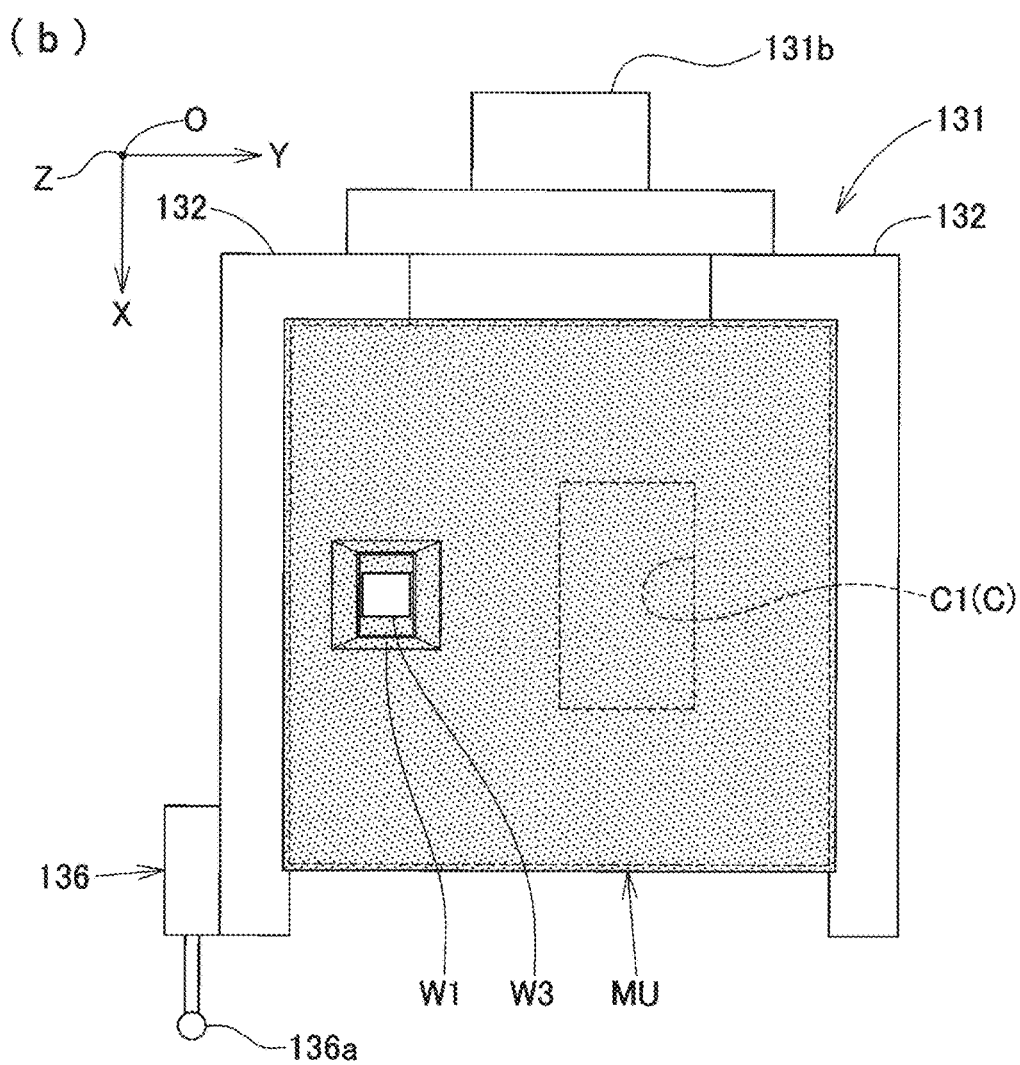
Figure 6:
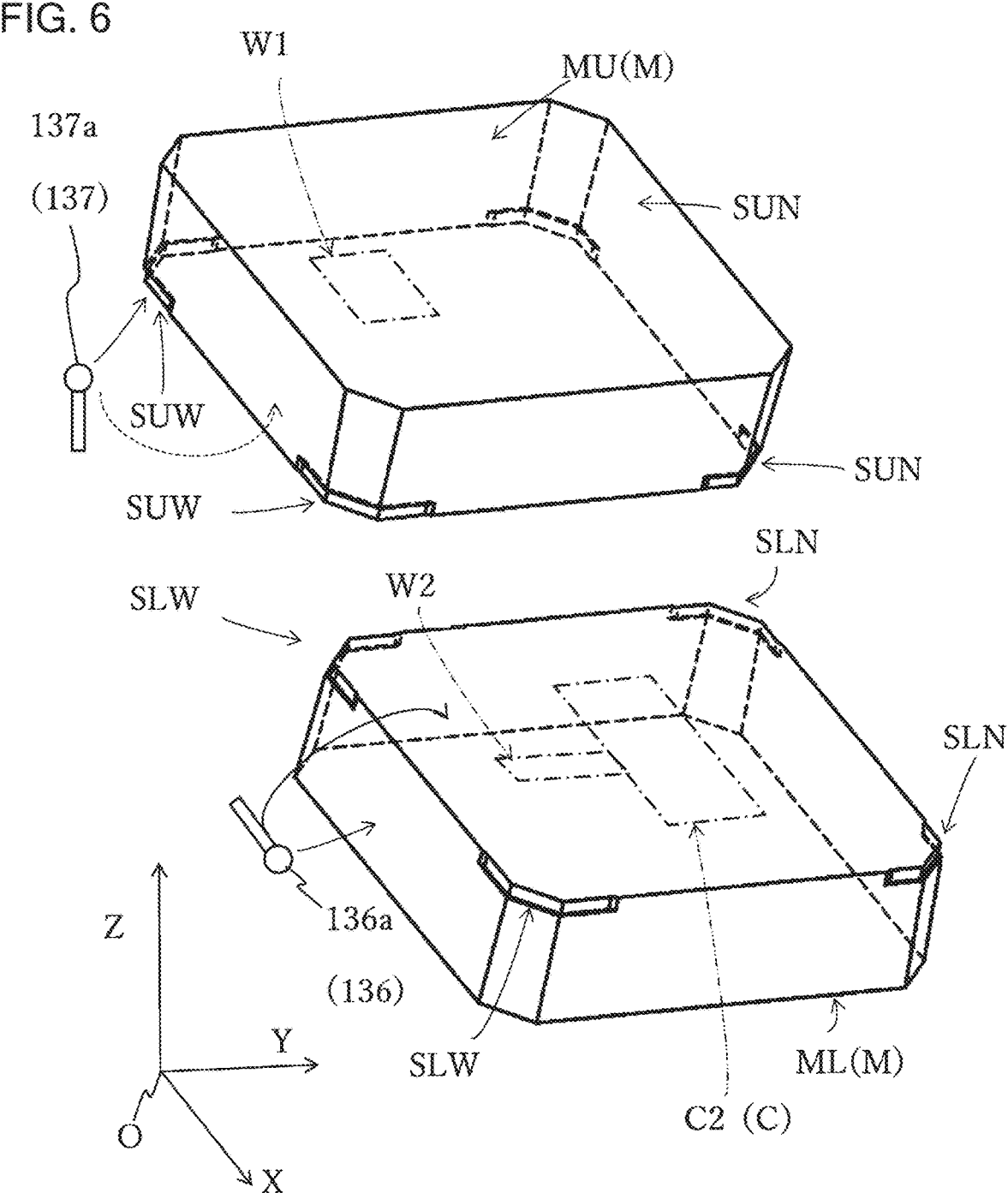
FIG. 6 is a perspective view of sand molds.

As shown in FIG. 1, a sand mold manufacturing method (entire manufacturing process ST001) according to the present invention includes: a shaping step ST100 of kneading casting sand and a binder, filling flasks therewith, and performing compression so that curing occurs in the flasks, to make sand blocks; a cutting step ST200 of forming sand molds from the sand blocks through cutting; and a mold matching step ST300 of performing mold matching between the upper and lower molds obtained through the cutting. As machining equipment 100, shaping equipment 110 shown in FIG. 2, cutting equipment 120 shown in FIG. 3, and mold matching equipment 130 shown in FIGS. 4 and 5 are used. As robots 101 of the equipment 100, a cutting robot 121 in the cutting equipment 120 and a mold matching robot 131 in the mold matching equipment 130 are used. Alternatively, a common robot may be used such that only a machining head and a gripping arm are replaced with each other as attachments.

A lower-mold shaping step ST110, a lower-mold cutting step ST210, and a lower-mold cleaning step ST310 are sequentially and consecutively performed. Likewise, an upper-mold shaping step ST130, an upper-mold cutting step ST230), and an upper-mold cleaning step ST330 are sequentially performed. Then, an upper-and-lower-molds mold matching step ST350 is performed. FIGS. 6 to 9 show sand molds. Firstly, the sand molds to be formed through cutting and to be subjected to mold matching will be described, and the manufacturing process will be described in order. It is noted that, in the case of batch processing, a large quantity of upper and lower molds may be shaped, cut, and stored in a primary place, and the upper and lower sand molds may be cleaned and subjected to the mold matching step at appropriate times as necessary.

A sand mold M shown in each of FIGS. 6 to 9 includes an upper mold MU and a lower mold ML. The upper and lower molds are matched with each other at respective mold matching surfaces Sm thereof which are respectively an upper-mold mold matching surface SmU and a lower-mold mold matching surface SmL. In these drawings, X, Y, and Z axes intersecting with one another at 90 degrees, and an origin O thereof, are shown. Meanwhile, in FIGS. 2 to 5, the directions of the axes are basically the same. The Z axis indicates an up-down direction which is basically, but is not limited to, the vertical direction. Meanwhile, X and Y axes each indicate a lateral direction which is basically, but is not limited to, a horizontal direction. A cavity C is formed in the upper and lower molds, and an upper cavity C1 and a lower cavity C2 are combined to form the cavity C. A pouring cup W1 and a molten-metal channel (sprue) W3 are formed in the upper mold, and the molten-metal channel W3 leads to a molten-metal channel W2 through which molten metal is supplied to the cavity C at a farther position.

Each of the sand molds has a bottom surface Sb from which perpendicular wall portions Sv are raised to be contiguous with gently tilted side surfaces Ss which extend to the corresponding mold matching surface Sm. The perpendicular wall portions Sv are used in lateral-direction position adjustment at the time of cutting described later. The gently tilted surfaces Ss are provided in order to: give drafts for making it easy to take out the sand mold from the corresponding shaping flask; be gripped by a gripping arm described later; and prevent lateral-direction position matching surfaces from laterally protruding and being damaged. These basic configurations are the same as those of the sand blocks.

As the mold matching surfaces, the upper-mold mold matching surface SmU and the lower-mold mold matching surface SmL are respectively provided to the upper and lower molds. By utilizing the upper-mold mold matching surface SmU and the lower-mold mold matching surface SmL, Z-axis positions at at least three points PU1 to 3, PL1 to 3 that are not located on a same straight line are ascertained, whereby mold matching can be performed while the upper-mold mold matching surface SmU and the lower-mold mold matching surface SmL are kept parallel to each other. The three points PU1 to 3 and the three points PL1 to 3 are provided near corners of the upper mold and the lower mold, respectively, whereby interference with the cavity C is prevented. Moreover, the points are distant from one another, whereby the tilts of the upper-mold mold matching surface SmU and the lower-mold mold matching surface SmL can be more accurately obtained.

The orientations and the positions in the lateral directions of the upper and lower molds in mold matching are ascertained and corrected by utilizing the lateral-direction position matching surfaces. X-axis lateral-direction position matching surfaces SUWX1 and SLNX2 for ascertaining displacement in the X-axis direction are surfaces extending along the Y axis. Likewise, Y-axis lateral-direction position matching surfaces SUWY1 and SLNY2 for ascertaining displacement in the X-axis direction are surfaces extending along the X axis. In addition, the lateral-direction position matching surfaces on the left side in the drawing sheets of FIGS. 6 to 9 are wider than the lateral-direction position matching surfaces on the right side in said drawing sheets. For example, the lateral-direction position matching surfaces on the left side and the right side are respectively 55 millimeters wide and 35 millimeters wide, but limitation thereto is not made. Therefore, the former surfaces are wide lateral-direction position matching surfaces SUW and SLW, i.e., the third one of the denoting characters is W, and the latter surfaces are narrow lateral-direction position matching surfaces SUN and SLN, i.e., the third one of the denoting characters is N.

Figure 8:
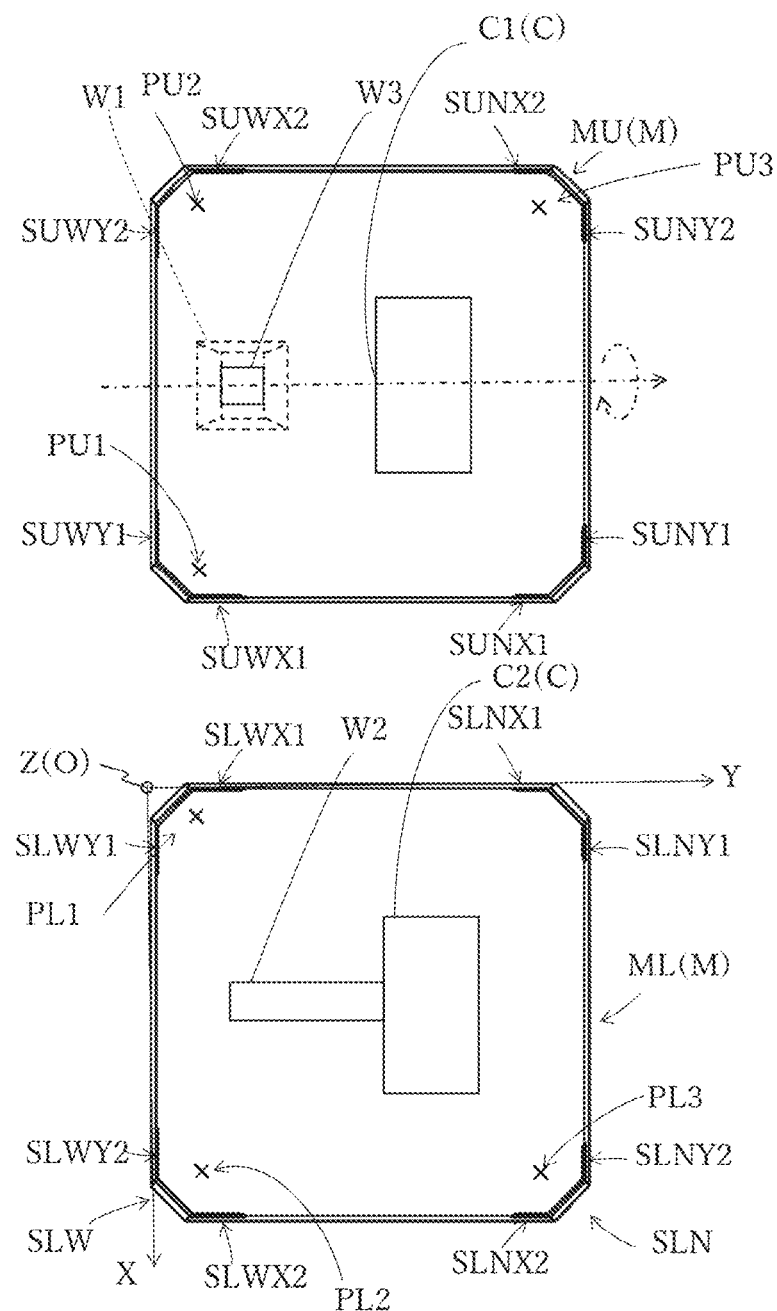
FIG. 8 is a development view, of the sand molds, with a Y axis being regarded as an axis of symmetry.
Figure 9:
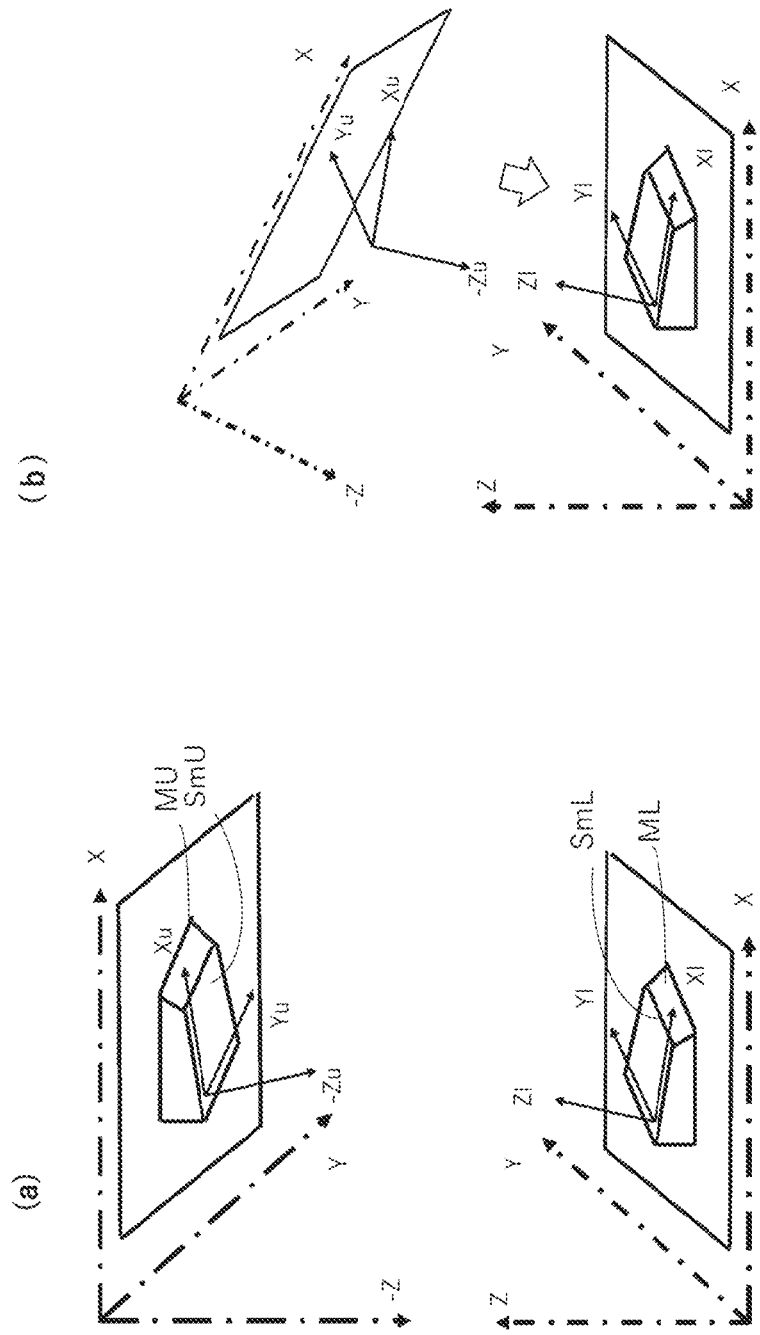
FIG. 9 shows a procedure for coincidence between coordinates on an upper mold and a lower mold, FIG. 9(a) showing a state before coordinate coincidence, FIG. 9(b) showing a state after coordinate coincidence.

The wide and narrow lateral-direction position matching surfaces are formed to coincide with each other between the upper and lower molds such that the upper and lower molds are not mistakenly oriented. In FIG. 8, the wide position matching surfaces and the narrow position matching surfaces are respectively shown on the left side and the right side and are arranged such that, in each diagonal direction, the corresponding wide and narrow position matching surfaces face each other. This arrangement achieves a configuration in which, when the upper and lower molds are superposed in a wrong direction, this erroneous superposition is immediately noticed by utilizing the position matching surfaces. The erroneous superposition can be determined through visual recognition or automatically determined through image recognition.

According to the above denotation rules, the X-axis lateral-direction position matching surfaces are denoted by SUWX1 and SLNX2, and the Y-axis lateral-direction position matching surfaces are denoted by SUWY1 and SLNY2. More specific examples of the terms are an upper wide first X-axis lateral-direction position matching surface SUWX1 and a lower narrow second Y-axis lateral-direction position matching surface SLNY2.

Next, details of each of the steps and manufacturing equipment used in the step will be described in order.

Figure 2:
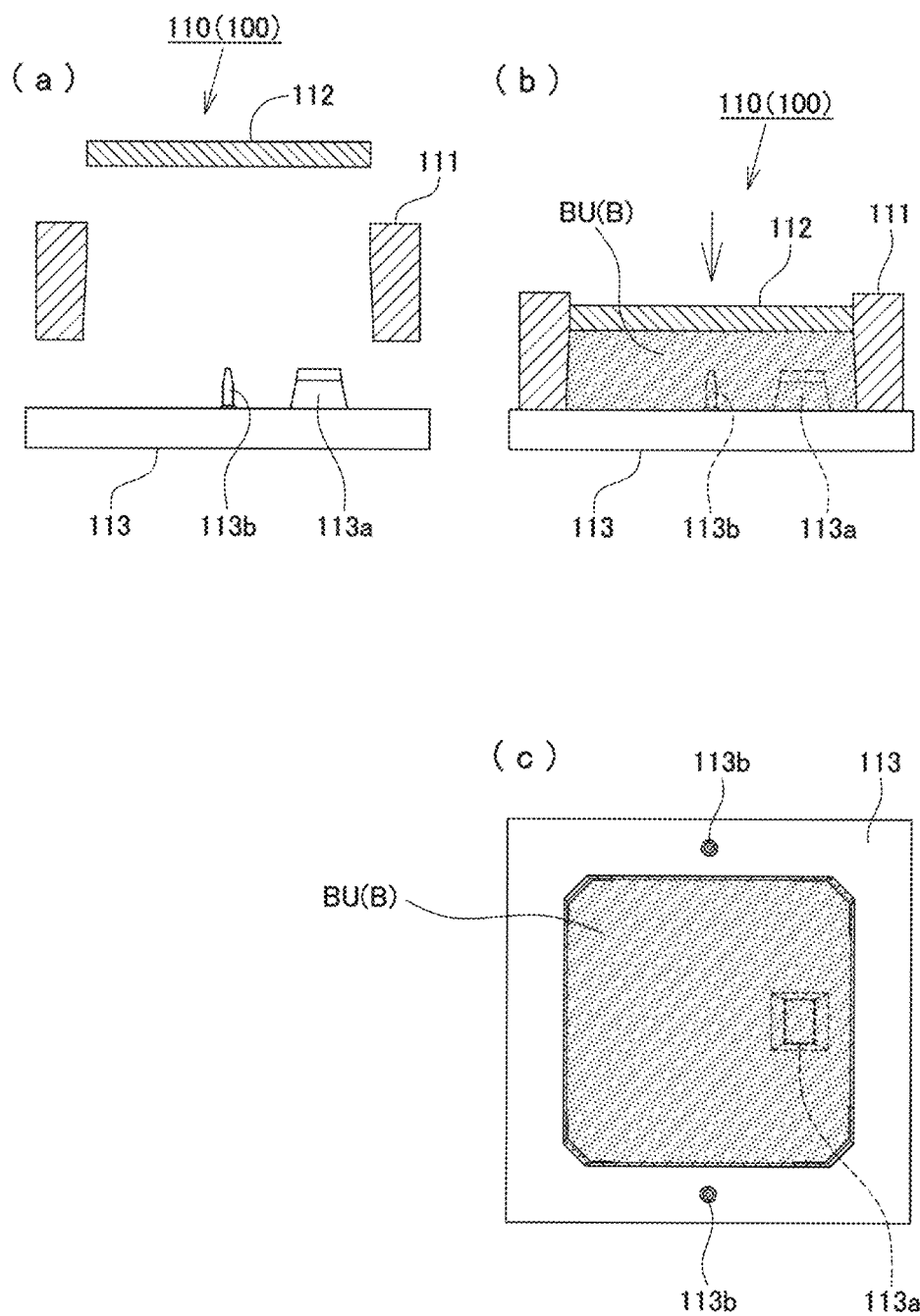
FIG. 2 shows a shaping step, FIG. 2(a) being a vertical cross-sectional view in which a shaping flask is separated, FIG. 2(b) being a vertical cross-sectional view during shaping, FIG. 2(c) being a plan view in a state where the shaping flask is detached.

Firstly, as shown in FIG. 2, the shaping equipment 110 used in the shaping step ST100 includes a shaping flask 111, a compression plate 112, a lower plate 113, a casting sand injection device (not shown), and a compression device (not shown) capable of vibration. The shaping flask 111 is used for each of an upper block BU and a lower block BL, Meanwhile, the lower plate 113 has: a position adjustment pin 113b which is the only portion thereof provided in common to both blocks; and a pouring cup pattern 113 provided only for the upper block BU. Pattern sharing between the upper block BU and the lower block BL is performed as much as possible, whereby decrease in shaping error is achieved. In addition, the provision of the pouring cup pattern 113a leads to decrease in the cutting amount of a sand mold and eliminates the need for performing inversion-cutting to cut a pouring cup from the back side, whereby the number of steps for manufacturing a sand mold is decreased.

Figure 3:
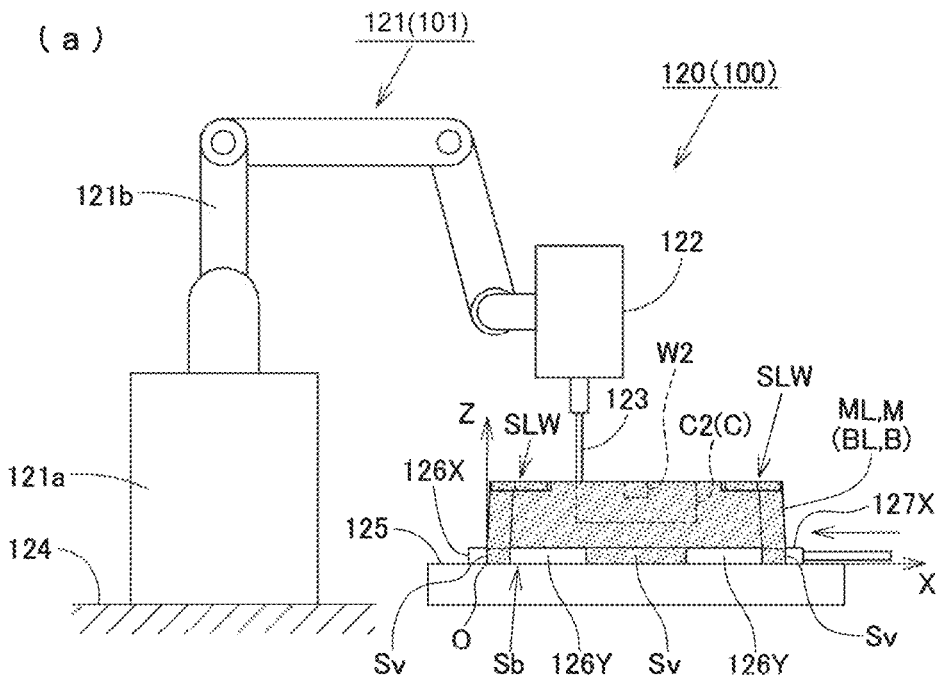
FIG. 3 shows cutting equipment for performing a cutting step, FIG. 3(a) being a side view, FIG. 3(b) being a plan view of a base.
Figure 3:
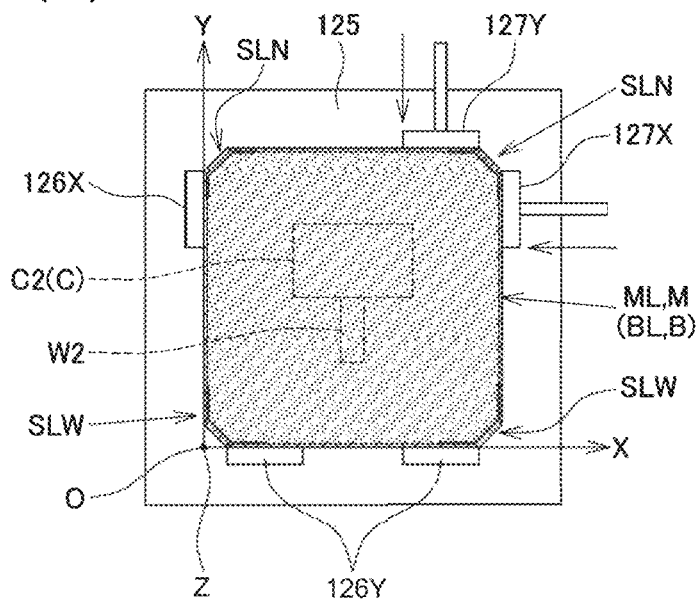

As shown in FIG. 3, the cutting equipment 120 used in the cutting step ST200 includes the cutting robot 121, a baseplate 124, a placement surface 125, and position adjustment pieces 126. The cutting robot 121 has: a pedestal 121a connected to the above baseplate 124 and placement surface 125; an articulated arm 121b on the pedestal 121a; and a machining head 122, for rotating a tool 123 such as a tool bit, which can be freely moved in the X, Y, and Z directions.

An origin O of the coordinate axes is set according to the position adjustment pieces 126 on the placement surface 125. In this drawing, to facilitate understanding, the origin O is set on the placement surface 125 at an intersection between an extension line of an X-axis position adjustment piece 126X which extends along the Y axis and which is for performing position adjustment in the X-axis direction and an extension line of a Y-axis position adjustment piece 126Y which extends along the X axis and which is for performing position adjustment in the Y-axis direction. Both the position adjustment pieces 126 and pressing pieces 127 are brought into contact with the perpendicular wall portions Sv raised from the bottom surface Sb of each of the sand molds. Consequently, the lateral-direction positions of the sand block are adjusted relative to the origin O, and the cutting amount is decreased to a minimum value. Specifically, both one X-axis position adjustment piece 126X and two Y-axis position adjustment pieces 126Y fix and support corresponding perpendicular wall portions Sv, and an X-axis pressing piece 127X and a Y-axis pressing piece 127Y are brought close to, and into contact with, corresponding perpendicular wall portions Sv on the respective opposite sides to restrict tilts relative to the X and Y directions.

Regarding the order of cutting, when the lower mold ML is cut first and then the upper mold MU is cut, mold matching can be started in the subsequent mold matching step immediately after the upper mold MU is cleaned. Thus, this order of cutting is advantageous in terms of decrease of the number of steps. However, the order of cutting is not limited thereto, Each portion is desirably cut such that, in the sand blocks BU and BL, the respective mold matching surfaces SmU and SmL are cut first, and then the lateral-direction position matching surfaces SU and SL, the cavity C, the molten-metal channel W2, and the like are cut. This is because, by performing cutting with the mold matching surfaces SmU and SmL being references, the entirety including the cavity C, the molten-metal channels W2 and W3, and the like is accurately formed, and position matching in the lateral directions is assuredly performed.

As shown in FIGS. 4 and 5, the mold matching equipment 130 used in the lower-mold cleaning step ST310, the upper-mold cleaning step ST330, and the upper-and-lower-molds mold matching step ST350 includes the mold matching robot 131, an air cleaning booth 133, a baseplate 134, placement surfaces 135, a first coordinate measurement sensor 136, and a second coordinate measurement sensor 137.

The mold matching robot 131 is provided with: a pedestal 131a; an arm 131b located on the pedestal 131a and having a distal end that can be freely moved in three-dimensional directions; and a gripping arm 132 located on the distal end. The gripping arm 132 has a pair of gripping pieces which are brought close to and away from each other so that a sand mold M can be gripped between a pair of gripping surfaces 132a opposed to each other. Unlike the perpendicular wall portions Sv, the side surfaces Ss of the sand mold M have such tapers as to, as opposed surfaces, get closer to each other as the side surfaces Ss get closer to the mold matching surfaces Sm. The gripping surfaces 132a also have same tapers. In particular, when the gripping surfaces 132a are brought into contact with the respective side surfaces Ss as in FIG. 5 in a state where the mold matching surface Sm of the upper mold MU faces downward, downward displacement of the upper mold MU can be prevented.

The air cleaning booth 133 is for removing, through cleaning, chips such as sand particles adhered on the sand mold M and has: an air cleaning chamber 133a; and an air nozzle 133b located below the air cleaning chamber 133a and having a large number of air holes. The above chips are blown off to perform cleaning, by air flows from the air nozzle 133b.

The mold matching robot 131 and each of the placement surfaces 135 are provided on the baseplate 134. Furthermore, the first coordinate measurement sensor 136 is provided to the gripping arm 132, and the second coordinate measurement sensor (another coordinate measurement sensor) 137 is provided on the baseplate 134. The first and second coordinate measurement sensors 136 and 137 respectively ascertain, by detection pieces 136a and 137a thereof, spatial coordinates of objects in contact with the detection pieces 136a and 137a in X, Y, and Z coordinate axes. The coordinate positions of the respective surfaces Sm, SU, and SL of a sand mold M on the placement surface 135 are ascertained by the first coordinate measurement sensor 136 of the gripping arm 132, and the coordinate positions of the respective surfaces Sm, SU, and SL of a sand mold M gripped by the gripping arm 132 are ascertained by the second coordinate measurement sensor 137 on the baseplate 134.

In this equipment, in each of the lower-mold cleaning step ST310 and the upper-mold cleaning step ST330, the above coordinate ascertaining is performed, and, after these steps, the upper-and-lower-molds mold matching step ST350 is performed based on the result of this coordinate ascertaining. The upper-mold cleaning step ST330 is similar to the lower-mold cleaning step ST310, and only the difference therebetween will be described.

In the lower-mold cleaning step ST310, first, a lower mold ML for which the cutting step has been finished is placed on any of first to third placement surfaces 135a to c which are the placement surfaces 135, with the mold matching surface Sm facing upward. Then, the detection piece 136a of the first coordinate measurement sensor 136 measures the positions of the plurality of lateral-direction position matching surfaces SL. Then, the gripping arm 132 grips the lower mold ML, rotates the lower mold ML in an inverted manner about an inversion axis parallel to the X axis, and causes the lower mold ML to enter the air cleaning chamber 133a of the air cleaning booth 133. Then, the air nozzle 133b applies air flows to the cavity C side from below to perform cleaning.

Thereafter, the lower mold ML is rotated in an inverted manner about the inversion axis again to cause the mold matching surface Sm to face upward, and is placed on any of the first to third placement surfaces 135a to c which are the placement surfaces 135. Then, the positions of the mold matching surface Sm and the lateral-direction position matching surfaces SL are measured as described later by the detection piece 136a of the first coordinate measurement sensor 136 of the gripping arm 132, to make preparations for mold matching.

The upper-mold cleaning step ST330 is similar in terms of the process up to the cleaning, but differs in terms of the following features. With the mold matching surface Sm kept facing downward, the upper mold MU gripped by the gripping arm 132 is brought close to the detection piece 137a of the second coordinate measurement sensor 137 on the baseplate 134, and the positions of the mold matching surface Sm and the lateral-direction position matching surfaces SL are measured as described later, to make preparations for mold matching.

Figure 7:
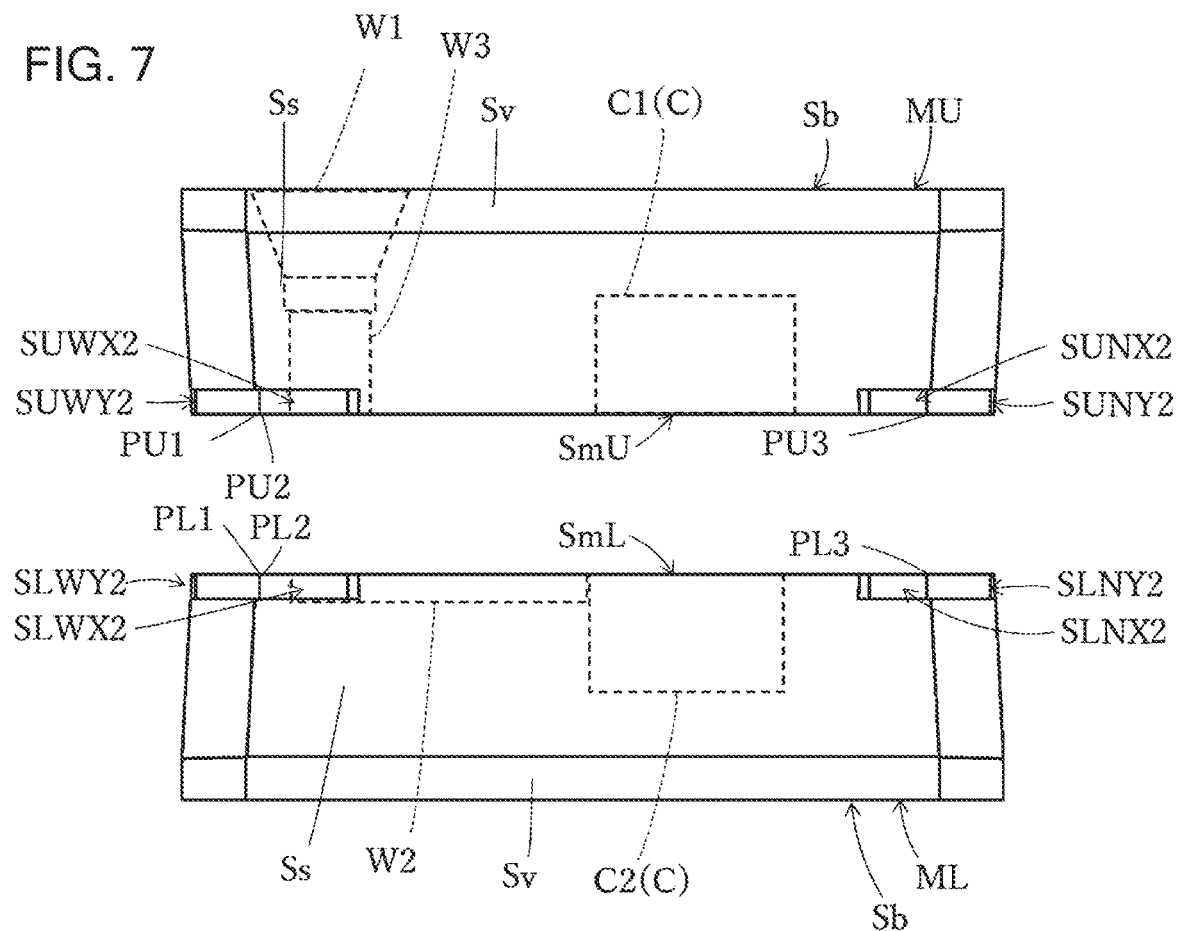
FIG. 7 is a front view of the sand molds.

Regarding the mold matching surfaces Sm, as shown in FIGS. 7 and 8, Z coordinates of the at least three points PU1 to 3 that are not located on a same straight line are recognized on the upper-mold matching surface SmU. Likewise, Z coordinates of the at least three points PL1 to 3 that are not located on a same straight line are recognized on the lower-mold matching surface SmL. When different lateral-direction positions are selected, the orientation of the upper side MU is adjusted by the mold matching robot 131 as in, for example, FIG. 9 described later such that the tilt of the lower-mold matching surface SmL and the tilt of the upper-mold matching surface SmU eventually become parallel to each other. Then, both mold matching surfaces SmU and SmL are brought close to, and joined to, each other.

Regarding the lateral-direction position matching surfaces SU and SL, as shown in FIGS. 7 and 8, two Y-axis lateral-direction position matching surfaces SUWY1 and SUWY2 and one X-axis lateral-direction position matching surface SUNX1 of the upper mold MU are measured, and two Y-axis lateral-direction position matching surfaces SLWY1 and SLWY2 and one X-axis lateral-direction position matching surface SLNX1 of the lower mold ML are measured. Then, the orientation of the upper mold MU is adjusted by the mold matching robot 131 such that the position of each of the position matching surfaces of the upper mold MU is matched with the position of the corresponding position matching surface of the lower mold ML. Then, both mold matching surfaces SmU and SmL are brought close to, and joined to, each other.

In the case of matching only the lateral-direction positions, in each of the upper and lower molds MU and ML, the number of X-axis lateral-direction position matching surfaces and the number of Y-axis lateral-direction position matching surfaces each only have to be one. However, when the two Y-axis lateral-direction position matching surfaces SUWY1 and SUWY2 and the two Y-axis lateral-direction position matching surfaces SLWY1 and SLWY2 are measured at respective positions away from each other, the tilts about the axis parallel to the Z axis can be corrected.

For coordinate coincidence in mold matching, measurement is performed on the lateral-direction position matching surfaces SLWX1, SLWY1, and SLWY2 and the three points PL1 to 3 on the lower-mold matching surface SmL of the lower mold ML in FIGS. 7 and 8, whereby the positions and the orientations in Xl, Yl, and Zl coordinate axes defined by the side surfaces and the mold matching surface SmL of the lower mold ML shown in FIG. 9(a) relative to the X, Y, and Z coordinate axes, of the mold matching equipment 130, indicated by alternate long and short dash lines, are measured. Likewise, the positions and the orientations in Xu, Yu, and Zu coordinate axes defined by the side surfaces and the mold matching surface SmU of the upper mold MU shown in FIG. 9(a) relative to the X, Y, and Z coordinate axes indicated by the alternate long and short dash lines, are measured (−Z and −Zl are respectively vectors indicating a negative Z direction and a negative Zl direction and are substantially the same).

Thereafter, position and orientation adjustment of the gripping arm 132 of the mold matching robot 131 is performed. Consequently, the molds are subjected to orientation adjustment and brought close to each other such that the Xl, Yl, and Zl coordinate axes and the Xu, Yu, and Zu coordinate axes are matched with each other. Thus, the coordinates coincide with each other, whereby accurate mold matching can be performed.

In addition, the mold matching is followed by lateral-direction coordinate checking in which, as shown in FIGS. 7 and 8, measurement is performed on: one Y-axis lateral-direction position matching surface SUNY2 and one Y-axis lateral-direction position matching surface SLNY2 of the respective upper and lower molds MU and ML; and one X-axis lateral-direction position matching surface SUNX2 and one X-axis lateral-direction position matching surface SLNX2 of the respective upper and lower molds MU and ML. The coordinates of these surfaces are matched between the upper and lower molds, whereby the accuracy of the mold matching can be checked.

After the above mold matching step, the mold M is subjected to a known pouring step. Pouring is performed from the pouring cup W1 side, and a casting is completed.

Lastly, other embodiments of the present invention will be described. The present invention is not limited to the embodiments described above and below and can be modified without deviating from the gist of the present invention. It is noted that, in the following description, the same members as those in the above embodiment are denoted by the same reference characters.

Although the X, Y, and Z axes do not have to be arranged to intersect with one another at 90 degrees, the arrangement involving intersection at 90 degrees is convenient in coordinate ascertaining. When the intersection angle between the lateral-direction position matching surfaces is equal to the intersection angle between the X and Y axes, the position matching can be performed by coordinate ascertaining in the direction of a single axis, i.e., the X or Y axis, alone.

When, regarding the X, Y, and Z coordinate axes, positions are ascertained with coordinate transformation being performed as appropriate through a known method, convenience is attained in terms of control of mold matching. For example, in the mold matching step ST300, in a case where the lower-mold mold matching surface SmL is not parallel to an XY plane, the XY plane is subjected to coordinate transformation with this lower-mold mold matching surface SmL being regarded as a reference plane relative to the origin O. Then, an up-down-direction axis is set to be orthogonal to the resultant plane, and the ascertaining is performed. Consequently, up-down-direction measurement of the above three points enables the upper-mold mold matching surface SmU to be kept parallel to the lower-mold mold matching surface SmL. Likewise, in a case where a plane defined by lower wide first and second Y-axis lateral-direction position matching surfaces SLNY1 and Y2 is not parallel to an XZ plane, it is preferable that X-and-Y-axes coordinate transformation is performed with the plane defined by the lower wide first and second Y-axis lateral-direction position matching surfaces SLNY1 and Y2 being regarded as a reference plane relative to the origin O, and each of the lateral-direction position matching surfaces is ascertained.

The lateral-direction mold matching surfaces selected above are merely an example, and lateral-direction mold matching surfaces at any corners may be selected.

In the above embodiment, sand blocks having substantially square shapes in a plan view are used. However, the shape of each of the sand blocks may be changed as appropriate to a rectangular shape, a polygonal shape having three or more sides, or the like.

Although the mold matching surface of each of the upper and lower molds has been described as one continuous place on one surface, the mold matching surface may be divided into two or more places. In the latter case, measurement may be performed, for each of the upper and lower molds, on three points collectively located in one place among the plurality of mold matching surfaces. Alternatively, measurement may be performed on three points distributed on the respective mold matching surfaces separate from one another. The mold matching surfaces only have to be such that portions thereof to be caused to coincide with each other are parallel between the upper and lower molds. In the above coincidence method in FIG. 9, regarding the Z coordinates of the at least three points PU1 to 3, PL1 to 3 that are not located on a same straight line, portions at lateral-direction positions having coordinates that are the same between the upper and lower sand molds do not necessarily have to be selected. However, by selecting portions at lateral-direction positions having coordinates that are the same between the upper and lower sand molds, when the ratio between measurement points on the Z coordinate axis at the respective portions is ascertained, the tilts of the mold matching surfaces SmU and SmL are easily obtained, and furthermore, a control parameter at the time of the mold matching is simplified.

As each of the at least three points PU1 to 3, PL1 to 3 that are not located on a same straight line, four or more points may be measured. Upper and lower mold matching surfaces only have to be estimated through a mathematical or geometrical method such as a method including measuring four or more points on each of the mold matching surfaces to estimate the surface and excluding a point suspected of having an error, and only have to be brought close to each other in a state of being kept parallel to each other. Thus, the coordinate coincidence method is not limited to that in FIG. 9.

Industrial Applicability

The present invention can be utilized as a mold manufacturing method. In particular, the present invention is suitable for manufacturing a wide variety of products in a small lot, and furthermore, makes it possible to provide a mold having little dimensional error.

DESCRIPTION OF THE REFERENCE CHARACTERS 100 machining equipment
101 robot
110 shaping equipment
111 shaping flask
112 compression plate
113 lower plate
113a pouring cup pattern
113b position adjustment pin
120 cutting equipment
121 cutting robot
121a pedestal
121b arm
122 machining head
123 tool
124 baseplate
125 placement surface
126 position adjustment piece
126X X-axis position adjustment piece
126Y Y-axis position adjustment piece
127 pressing piece
127X X-axis pressing piece
127Y Y-axis pressing piece
130 mold matching equipment
131 mold matching robot
131a pedestal
131b arm
132 gripping arm
132a gripping surface
133 air cleaning booth
133a air cleaning chamber
133b air nozzle
134 baseplate
135 placement surface
135a to c first to third placement surfaces
136 first coordinate measurement sensor
136a detection piece
137 second coordinate measurement sensor (another coordinate measurement sensor)
137a detection piece
B sand block
BU upper block
BL lower block
M sand mold
MU upper mold
ML lower mold
SmU upper-mold mold matching surface
SmL lower-mold mold matching surface
O XYZ origin (reference for spatial coordinates), with Z axis being up-down-direction axis and with X and Y axes orthogonal to Z axis being lateral-direction axes
C cavity
C1 upper cavity
C2 lower cavity
W1 pouring cup
W2 molten-metal channel
W3 molten-metal channel (sprue)
SU, SL lateral-direction position matching surface
SU upper lateral-direction position matching surface
SL lower lateral-direction position matching surface
Ss side surface
Sv perpendicular wall portion
Sb bottom surface
SUW, SLW wide lateral-direction position matching surface
SUN, SLN narrow lateral-direction position matching surface
SUWX1, SLNX2 X-axis lateral-direction position matching surface
SUWY1, SLNY2 Y-axis lateral-direction position matching surface
SUWX1 (example) upper wide first X-axis lateral-direction position matching surface SLNY2 (example) lower narrow second Y-axis lateral-direction position matching surface
PU1 to 3, PL1 to 3 at least three points that are not located on same straight line
ST001 entire manufacturing process
ST100 shaping step
ST110 lower-mold shaping step
ST130 upper-mold shaping step
ST200 cutting step
ST210 lower-mold cutting step
ST230 upper-mold cutting step
ST300 mold matching step
ST310 lower-mold cleaning step
ST330 upper-mold cleaning step
ST350 upper-and-lower-molds mold matching step

The invention claimed is:

1. A mold manufacturing method comprising: kneading casting sand and a binder, filling flasks therewith, performing compression so that curing occurs in the flasks, and performing removal from the flasks, to make sand blocks; performing a cutting step; and performing a mold matching step, to manufacture a sand mold, wherein
the mold manufacturing method is performed with
a machining head configured to be operated by a robot to cut the sand blocks and cut upper and lower molds,
a gripping arm configured to be operated by a robot to grip the upper mold and perform matching between mold matching surfaces, of the upper and lower molds, in which cavities are formed, and
a coordinate measurement sensor configured to detect a coordinate through contact, with a detection piece, of at least the upper mold gripped by the gripping arm,
side surfaces of the sand mold have such slopes as to, as opposed surfaces, get closer to each other as the side surfaces get closer to the mold matching surfaces,
gripping surfaces of the gripping arm also have same slopes as those of the side surfaces of the sand mold,
a Z axis for defining Z coordinates extends in an up-down direction,
the cutting step includes
forming, through cutting, the mold matching surfaces in the respective upper and lower molds by the machining head and
forming, through cutting, the cavities in the respective upper and lower molds by the machining head with the mold matching surfaces being references, and
the mold matching step includes
measuring at least three points that are not located on a same straight line and that are located on the mold matching surface of the lower mold placed on a placement surface,
causing recognition of Z coordinates of these respective points,
measuring at least three points that are not located on a same straight line and that are located on the mold matching surface in the upper mold gripped by bringing the gripping surfaces of the gripping arm into contact with the side surfaces,
causing recognition of Z coordinates of these respective points, and
subsequently performing mold matching by the gripping arm with the mold matching surfaces of the upper and lower molds being oriented to be kept parallel to each other.

2. The mold manufacturing method according to claim 1, wherein
X and Y coordinates for defining lateral directions in X and Y axes orthogonal to the Z axis are present,
the cutting step includes forming, through cutting, at least two lateral-direction position matching surfaces near each of the mold matching surfaces of the upper and lower molds by the machining head, the lateral-direction position matching surfaces being oriented such that an intersection angle therebetween is equal to an intersection angle between the X and Y axes, and
the mold matching step includes
causing recognition of X and Y coordinates of the respective lateral-direction position matching surfaces in each of the upper and lower molds,
causing lateral-direction positions of the upper and lower molds to coincide with each other, and
performing mold matching by the gripping arm.

3. The mold manufacturing method according to claim 2, wherein at least one of the at least two lateral-direction position matching surfaces is provided at two or more positions away from each other.

4. The mold manufacturing method according to claim 3, wherein
each of the sand blocks that form the upper and lower molds has a convex polygonal shape in a plan view, and
each of the lateral-direction position matching surfaces is formed at a corresponding corner of the convex polygonal shape.

5. The mold manufacturing method according to claim 4, wherein
the convex polygonal shape is a rectangular shape, and
the lateral-direction position matching surfaces are formed such that cutting lengths thereof differ between adjacent corners and facing corners of the rectangular shape and the cutting lengths are equal between the upper and lower molds.

6. The mold manufacturing method according to claim 2, wherein
each of the upper and lower molds has, near the mold matching surface thereof, at least two other lateral-direction position matching surfaces obtained through machining by the corresponding robot in addition to the two lateral-direction position matching surfaces, none of the at least two other lateral-direction position matching surfaces being parallel to each other, and
X and Y coordinates of two points on the other lateral-direction position matching surfaces in each of the upper and lower molds are recognized, to perform checking regarding the mold matching.

7. The mold manufacturing method according to claim 2, wherein, in the cutting by the corresponding robot, each of the sand blocks has, on an upper side thereof, a formation surface for the corresponding cavity and has a perpendicular wall portion on a side surface thereof near a lower surface of the sand block, and a position adjustment piece is brought into contact with the perpendicular wall portion which is then used as a reference for a horizontal coordinate in the cutting by the robot.

8. The mold manufacturing method according to any one of claims 1 to 7, wherein
the gripping arm is provided with a coordinate measurement sensor configured to measure a coordinate through contact with the detection piece,
after the lower mold is placed on a placement surface for placement thereon of the lower mold, the coordinate measurement sensor is used to cause recognition of each of the coordinates on the lower mold placed on the placement surface, another coordinate measurement sensor is provided at a portion connected to the placement surface for placement thereon of the lower mold, and, for the upper mold gripped by the gripping arm, the other coordinate measurement sensor is used to cause recognition of each of the coordinates on the upper mold in a state where the upper mold is gripped.

* * * * *